United States Patent Office 3,278,500
Patented Oct. 11, 1966

3,278,500
SULFUR-CONTAINING POLYMERS
Frederick E. Bailey, Jr., and Edward M. La Combe, Charleston, and Russell H. Raines, St. Albans, W. Va., assignors to Union Carbide Corporation, a corporation of New York
No Drawing. Filed Dec. 7, 1960, Ser. No. 74,220
2 Claims. (Cl. 260—79.7)

The invention relates to polymers of alkylthioalkyl and akylsulfonylalkyl esters, their use as viscosity index additives and sludge dispersing additives for lubricating oils, and to lubricating oil compositions containing them.

It is known in the art that minor amounts of certain materials can be added to lubricating oils to lower the rate of change of viscosity of the oil with change of temperature, that is, to increase the viscosity index of said oils. A high viscosity index is desirable, for example, in automobile engine crankcase lubricating oils, where the oil must be fluid for cold starting, but must still have acceptable load-carrying and friction characteristics at operating temperatures.

Another desirable characteristic of engine lubricating oils is the ability to disperse carbonaceous sludge, and thereby to assist in maintaining general engine cleanliness.

It is an object of the invention to provide useful polymers of alkylthioalkyl and alkylsulfonylalkyl esters. It is another object of the invention to provide polymers which have utility as viscosity index improvers for lubricating oils. A further object of the invention is to provide polymers which have utility as carbonaceous sludge dispersants in lubricating oils. Still another object of the invention is to provide lubricating oil compositions containing therein a minor amount of the novel polymers of the invention.

The polymeric composition of the invention comprises a copolymer which has (1) from about 2 to about 20 weight percent of a recurring structural unit selected from the group consisting of

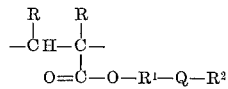

and

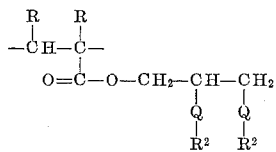

wherein each R individually is either hydrogen or methyl, $R^1$ is a divalent, saturated hydrocarbon radical having from one to four, and preferably two, carbon atoms, each $R^2$ individually is a monovalent, saturated hydrocarbon radical having from one to four carbon atoms, and Q is either thio (—S—) or sulfonyl (—SO$_2$—); and (2) from about 80 to about 98 weight percent of the recurring structural unit

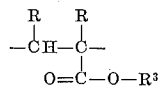

wherein each R individually is either hydrogen or methyl, and $R^3$ is a monovalent, saturated hydrocarbon radical having from one to eighteen, preferably from four to twelve, and most preferably from eight to ten carbon atoms.

The polymeric compositions of the invention preferably have reduced viscosities of from about 0.5 to about 3.0. The reduced viscosity of a polymer is an indication of its molecular weight, and is determined by dividing the specific viscosity by the concentration being measured in grams of polymer per 100 milliliters of solvent at a given temperature. The specific viscosity is obtained by dividing the difference between the viscosity of the solution and the viscosity of the solvent by the viscosity of the solvent. Unless other indicated, the reduced viscosity values given in the examples were determined at a concentration of 0.2 grams of polymer in 100 milliliters of benzene at 30° C.

The novel polymers of the invention can be prepared by copolymerizing a mixture which comprises (1) from about 2 to about 20 weight percent of a compound that is represented either by Formula I (I) 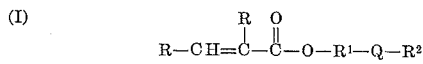

or by Formula II (II) 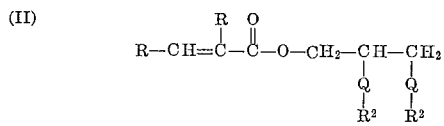

wherein each R individually is either hydrogen or methyl, $R^1$ is a divalent, saturated hydrocarbon radical having from one to four, and preferably two, carbon atoms, each $R^2$ individually is a monovalent, saturated hydrocarbon radical having from one to four carbon atoms, and Q is either thio or sulfonyl; and (2) from about 80 to about 98 weight percent of a compound that is represented by Formula III (III) 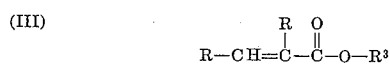

wherein each R individually is either hydrogen or methyl, and $R^3$ is a monovalent, saturated, aliphatic hydrocarbon radical having from one to eighteen carbon atoms.

Exemplary of the esters that are represented by Formula I are 2-methylthioethyl acrylate, 2-methylsulfonylethyl acrylate, 2-ethylthioethyl acrylate, 2-ethylsulfonylethyl acrylate, 2-methylthioethyl methacrylate, methylsulfonylmethyl crotonate, 2-propylthioethyl acrylate, 2-butylthiopropyl methacrylate, 3-methylthiopropyl crotonate, 4-methylthiobutyl acrylate, 4-ethylsulfonylbutyl methacrylate, and the like.

Illustrative of the esters that are represented by Formula II are 2,3-bis(methylthio)propyl acrylate, 2,3-bis(methylsulfonyl)propyl acrylate, 2,3-bis(ethylthio)propyl methacrylate, 2,3-bis(isopropylthio)propyl crotonate, 2,3-bis(butylsulfonyl)propyl acrylate, 2-methylthio-3-ethylthiopropyl acrylate, and the like.

The esters that are represented by Formulas I and II can be prepared by methods such as the reaction of the corresponding sulfur-containing alcohol with an acid chloride of acrylic, methacrylic, or crotonic acid, by ester exchange, and the like.

The thio-containing alcohols can be prepared, for example, by reacting an alcohol having a halogen substituent with an alkali metal alkyl sulfide. The following reaction is illustrative:

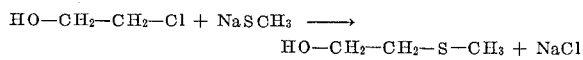

The sulfonyl derivative can be prepared by direct oxidation of the corresponding thio-containing alcohol with at least two equivalents of peroxide, such as peracetic acid, hydrogen peroxide, and the like.

Examples of esters which are represented by Formula III include methyl acrylate, ethyl methacrylate, isopropyl crotonate, butyl acrylate, the pentyl acrylates, the hexyl methacrylates, the heptyl crotonates, the octyl acrylates, the nonyl acrylates, the decyl acrylates, the undecyl methacrylates, the dodecyl crotonates, the tridecyl methacrylates, the tetradecyl acrylates, the pentadecyl methacrylates, the cetyl crotonates, the heptadecyl crotonates, the stearyl acrylates, and the like. The most preferred are the isodecyl esters of acrylic and methacrylic acid.

The polymerization reaction is normally carried out in the presence of a free radical polymerization initiator (catalyst) such as dibenzoyl peroxide, cumene hydroperoxide, diacetyl peroxide, and the like. The catalyst is generally employed in amounts of from about 0.2 to about 2.0 weight percent, based on total monomer weight. The reaction mixture can be heated to the activation temperature of the catalyst, or a material such as cobalt naphthenate can be added in small amounts to cause the peroxide to activate at room temperature, whichever is desired. Normally, the polymerization is carried out at a temperature of from about 20° C. to about 200° C., with heating or cooling as needed to maintain the mixture at the desired temperature.

The time for the polymerization will depend on a variety of factors, such as nature of catalyst, nature of monomers, reaction temperature, and the like, and can vary over a wide range. For example, a suitable reaction time is found in the range of from about one hour to about 200 hours. Atmospheric, sub-atmospheric, or super-atmospheric pressure can be employed, as desired.

Preferably, the polymerization is carried out in solution. Hydrocarbon solvents such as benzene, toluene, xylene, hexane, cyclohexane, heptane, octane, and the like, are preferred for this purpose. If desired, the polymerization can also be carried out as bulk or suspension polymerization processes.

The invention is also directed to lubricating oil compositions which comprise a major amount of a lubricating oil and from about 0.1 weight percent to about 4.0 weight percent, based on weight of lubricating oil, of the polymeric compositions of the invention.

The lubricating oil can be any of the commonly known lubricating oils. They can be straight mineral oils or distillates derived from paraffinic, naphthenic, asphaltic, or mixed base crudes. The oils can be refined by conventional methods, such as acid, alkali, or clay refined oils. The oils can be produced by solvent extraction, they can be hydrogenated oils, they can be synthetic oils, and the like. The preferred oils are the mineral lubricating oils having viscosities in the range of from about 30 to about 300 Saybolt Universal seconds at 210° F.

Lubricating oil compositions containing therein the polymeric compositions of the invention have improved viscosity indices and improved ability to disperse carbonaceous sludge. This utility is illustrated in the examples which follow.

EXAMPLE I (A) *Preparation of 2-methylsulfonylethanol*

A 5 liter, 4 neck, creased reaction flask was fitted with a mechanical stirrer, thermometer, inlet funnel, condenser, and cooling bath. 2-methylthioethanol (552 grams), was stirred at 30° C., or below, while feeding peracetic acid (3735 grams 24.6% solution in ethyl acetate) dropwise over 6 hours. The reaction was exothermic. It was transferred to a boiling flask and stripped free of solvent under reduced pressure, final temperature 95° C./15 mm. The crude 2-methylsulfonylethanol was diluted with 1,000 grams methanol and 4 grams concentrated sulfuric acid. This mixture was heated until all of the methyl acetate was removed, and the catalyst neutralized with 8 grams calcium acetate. The product was filtered and distilled. After a small head cut 145° C./1.5 mm., there was distilled 676 grams of 2-methylsulfonylethanol, $n$ 30/$D$=1.4771, at 145–150° C./1.5 mm. which represents a 91% yield. There remained 30 grams of residue.

(B) *Preparation of 2-methylsulfonylethyl acrylate*

A 2 liter, 4 neck, creased reaction flask was fitted with a mechanical stirrer, thermometer, condenser, and heating mantle. The charge:

A mixture of

| | |
|---|---|
| 2-methylsulfonylethanol _____grams__ | 224 |
| Acrylyl chloride _____grams__ | 181 |
| Benzene _____liter__ | 0.5 | was stirred in a reaction flask while heating under reflux for 4 hours (about 80° C.). The product was transferred to a boiling flask and the benzene was stripped off. A 202-gram fraction was then distilled at 150–178° C./1½ mm. Hg. Redistillation of the fraction through a column yielded 85 g. of 2-methylthioethyl acrylate having a boiling range of 145–155° C. at 1.5 mm. and a refractive index $n$ 30/D 1.4781–83.

A sample of the monomer, which was found to be water insoluble, and a catalytic amount of dibenzoyl peroxide was heated on a steam bath and formed a hard polymer in about 5 minutes. The polymer was soluble in acetonitrile.

A sample of the monomer was submitted for infrared analysis: 2.9 microns=OH (weak-app. 2% as alcohol); 5.85 microns=conjugated ester C=O; 6.14, 6.17 microns=acrylate C=C; 7.7 microns=SO$_2$; 8.4 microns=ester C—O; 8.85 microns=SO$_2$; 10.2, 10.4 microns=vinyl.

The identity of the subject compound was confirmed by the infrared analysis and the fact that polymer is formed with free radical catalyst.

EXAMPLE II 2-ethylthioethyl acrylate was prepared by ester exchange from 2-ethylthioethanol and methyl acrylate using Mg(OMe)$_2$[1] catalyst by the following procedure:

A still, having a 3 liter pot, was charged:

| | |
|---|---|
| 2-ethylthioethanol _____grams__ | 424 |
| Methyl acrylate _____grams__ | 1032 |
| Age-rite (phenyl-beta-naphthylamine) ____grams__ | 2.9 |
| 18% Mg(OMe)$_2$ in methanol _____ml__ | 26 |

After refluxing 2 hours and removing 80 grams methanol-methyl acrylate the reaction slowed down. After cooling to room temperature an additional 26 ml. of 18% Mg(OMe)$_2$ in methanol was added and the pot heated for 6 hours. During this time a total of 340 grams of methanol-methyl acrylate azeotrope was obtained. The distillate had a refractive index of 1.367 at 30° C., which indicates 41.6% or 142 grams of methanol. The pot was cooled to room temperature, and 5 ml. H$_2$O added to destroy any remaining catalyst, and then filtered after adding about 100 ml. methanol to break up any "gel." The filtered product was distilled to give 386 g. of 2-ethylthioethyl acrylate, B.P. 75° C. at 5 mm., $n$ 30/D 1.4740.

Samples of the monomer were submitted for elemental and infrared analyses, the results of which are as follows:

| | Found, Percent | Theory, Percent |
|---|---|---|
| C | 51.9 | 52.5 |
| H | 7.57 | 7.5 |
| S | 18.64 | 20.0 |

Infrared analysis showed ester C=O at 5.84 microns; =CH$_2$/=CH$_2$ at 3.23 microns; C=C conjugation of acrylate at 6.12 and 6.17 microns; ester C—O at 8.4 microns, acrylate —CH=CH$_2$ at 9.45 and 10.15 microns; (CH$_2$)$_2$ at 12.3 microns, this band appears in ethyl ac-

---

[1] Mg(OMe)$_2$=Magnesium methoxide prepared from magnesium metal turnings and methanol.

rylate; C—S—C at 15.1 microns. This spectrum was consistent with that of acrylate esters.

It was concluded that 2-ethylthioethyl acrylate was prepared at about 67.5% conversion and its identity confirmed by analysis.

EXAMPLE III

*(A) Preparation of 2,3-bis(methylthio)-1-propanol*

2,3-bis(methylthio)-1-propanol was prepared from 2,3-dichloropropanol and sodium methyl sulfide by the following procedure:

A 5 liter, 4 neck, creased reaction flask was fitted with a mechanical stirrer, condenser, and inlet tube. A 25 percent solution of sodium methyl sulfide, $NaSCH_3$, was prepared by dissolving 12.3 mols NaOH in 2374 grams water and bubbling in gaseous $CH_3SH$ until 12.3 mols had been absorbed. The solution was cooled to 40° C. and 774 grams 2,3-dichloropropanol added dropwise. The reaction was very exothermic. The reaction product was cooled to 40° C. and transferred to a 4 liter separatory funnel. The lower water layer was decanted and the oil layer washed once with distilled water, decanted. The oil layer was then transferred to a 1 liter boiling flask, and distilled to yield 531 grams of 2,3-bis(methylthio)-1-propanol having a B.P. 79° C. at 0.7 mm. and $n$ 30/D 1.5340–9.

Infrared showed no evidence of chlorine at 15.2 microns. Analysis showed percent C=39.4; percent H=8.3 and percent S=40.41; theory—39.5%; 7.9% and 42.3%.

*(B) Preparation of 2,3-bis(methylthio)propyl methacrylate*

2,3-bis(methylthio)propyl methacrylate was prepared by ester exchange from 2,3-bis(methylthio) propanol and methyl methacrylate using $Mg(OMe)_2$ catalyst, by the following procedure:

To a 2 liter boiling flask was charged

|  | Grams |
|---|---|
| 2,3-bis(methylthio)-1-propanol | 304 |
| Methyl methacrylate | 400 |
| Benzene | 600 |
| Age-rite powder (phenyl-beta-naphthylamine) | 4 |

The flask was then attached to a vacuum still. The catalyst, 16.7 ml. 20% $Mg(OMe)_2$ in methanol, was then added after drying the system, and the methanol was stripped off. The reaction was very slow, so another 16.7 ml. of catalyst solution was added. After refluxing 6 hours, 188 grams of methanol-benzene, constant boiling mixture, was removed, which had a refractive index of 1.4300 (corresponding to 38% methanol). Refluxing was again continued for 7 hours, and 97 grams additional benzene-methanol having a refractive index of 1.4480, 28% methanol, was removed. The reactants were allowed to cool to room temperature and 20 ml. $H_2O$ added to destroy any remaining catalyst. The solution was diluted with 1500 ml. methanol to precipitate any polymer, filtered, and the filtrate stripped free of solvent under vacuum. The product was distilled to yield 258 g. of 2,3-bis(methylthio)propyl methacrylate having B.P. 107–109 at 1.5 mm. and $n$ 30/D 1.5090–98.

Analysis showed 49.6% C, 7.6% H, 27.5% S. Theory=49.2% C, 7.28% H, 29.1% S.

EXAMPLE IV

*Preparation of polymer*

A citrate bottle, app. 275 ml. capacity, was flushed with nitrogen and charged, 1.0 grams 2-ethylthioethyl acrylate
9.0 grams isodecyl acrylate
20.0 ml. dry acetone
1% diacetyl peroxide (25% solution in dimethyl phthalate)

The bottle was reflushed with nitrogen, capped and placed in a rotating 50° C. constant temperature bath for 23 hours. The resin was worked up in methanol and dried in a 50° C. forced air oven. The dry resin weighed 8.95 grams, and had a reduced viscosity (0.2 gram resin/100 ml. benzene at 30° C.) of 0.79. The resin was dissolved in benzene, diluted in oil, and the benzene removed by distillation.

EXAMPLES V–VIII

By a procedure analogous to that described in Example IV, polymers having the following compositions are prepared:

| Example | Weight Percent | Component |
|---|---|---|
| V | 1 | 2-methylthioethyl acrylate. |
|  | 99 | Isodecyl acrylate. |
| VI | 15 | 2-methylthioethyl acrylate. |
|  | 85 | Isodecyl acrylate. |
| VII | 15 | 2-methylthioethyl acrylate. |
|  | 85 | Isodecyl acrylate. |
| VIII | 15 | 2,3-bis(methylthio)propyl acrylate. |
|  | 85 | Isodecyl acrylate. |

EXAMPLE IX

A citrate bottle (approximately 275 ml. capacity) was flushed with nitrogen and charged:

1.5 grams 2-methylthioethyl acrylate
28.5 grams isodecyl acrylate
30.0 grams heptane
1.0% diacetyl peroxide (25% solution in dimethyl phthalate).

The bottle was reflushed with nitrogen, capped and placed in a bottle bath which rotates end over end at 50° C. for 17.5 hours. Total solids showed 96.5 percent conversion, and a reduced viscosity (0.2 gram resin/100 ml. benzene at 30° C.) of 0.88 was determined for the copolymer.

The sample, in heptane solution was treated with 2 equivalents of peracetic acid (25% solution in ethyl acetate based on the 2-methylthioethyl acrylate, in order to prepare the sulfonyl derivative. It was allowed to stand at ambient temperature for one hour. The reaction was exothermic. The bottle was then tumbled in a water bath at 50° C. for one hour to insure as much reaction as possible.

The treated resin solution was then diluted with 45 grams of mineral oil, and the heptane removed by distillation. Lab bench-scale dispersion tests showed the copolymer to be a superior dispersant for carbonaceous sludge when mixed with lubricating oils.

EXAMPLE X

By a procedure analogous to that of Example IX, a copolymer having the following composition was prepared:

| Component | Weight, percent |
|---|---|
| 2-methylsulfonylethyl acrylate | 9 |
| Isodecyl acrylate | 91 |

The polymers prepared in Examples IV through X were tested for their ability to increase the viscosity index of a lubricating oil. The oil employed in all of the tests was a Mid-Continent solvent refined oil, having a viscosity of 150 SUS at 100° F. and having a viscosity index of 102. The results of the evaluation tests are shown in the table below.

VISCOSITY INDEX EVALUATION

| Example | Reduced Viscosity | Viscosity Index |  |  |
|---|---|---|---|---|
|  |  | Weight Percent Polymer in Oil |  |  |
|  |  | 0.75 | 1.5 | 2.0 |
| IV | 0.79 | 117.5 | 130.7 | 136.3 |
| V | 2.59 | 143.2 | 140.4 | 139.2 |
| VI | 1.69 | 138.8 | 151.1 | 152.6 |
| VII | 0.85 | 130.7 | 141.2 | 144.6 |
| IX | 0.88 | 146.6 | 151.2 | 149.8 |
| X | 1.61 | 127.5 | 121.7 | 148.8 |

What is claimed is:

1. A polymeric composition which comprises a resinous copolymer having (1) from about 2 to about 20 weight percent of a recurring structural unit of the formula

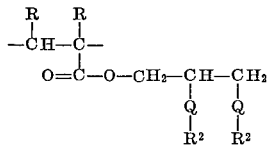

wherein each R individually is a member selected from the group consisting of hydrogen and methyl, each $R^2$ individually represents alkyl of from 1 to 4 carbon atoms, and Q represents a member selected from the group consisting of thio and sulfonyl, and correspondingly (2) from about 80 to about 98 weight percent of the recurring structural unit of the formula

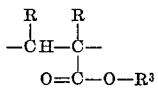

wherein each R individually represents a member of the group consisting of hydrogen and methyl, and $R^3$ represents alkyl of from 8 to 10 carbon atoms.

2. A polymeric composition which comprises a resinous copolymer of 2,3-bis(methylthio)propyl methacrylate and isodecyl acrylate wherein said copolymer contains from about 2 to about 20 weight percent of the recurring structural unit

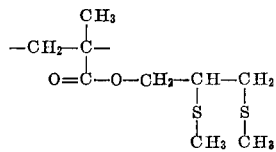

References Cited by the Examiner

UNITED STATES PATENTS

| | | | |
|---|---|---|---|
| 2,091,627 | 8/1937 | Bruson | 260—89.5 |
| 2,100,993 | 11/1937 | Bruson | 260—89.5 |
| 2,129,662 | 9/1938 | Barrett et al. | 260—86.1 |
| 2,544,376 | 3/1951 | Butler | 252—56 |
| 2,604,453 | 7/1952 | Popkin | 252—56 |
| 2,812,267 | 11/1957 | Garner et al. | 260—79.3 |
| 2,876,213 | 3/1959 | Bartlett et al. | 260—89.5 |
| 2,925,406 | 2/1960 | McCurdy et al. | 260—79.7 |
| 3,102,863 | 9/1963 | Herbert et al. | 260—79.3 |

FOREIGN PATENTS 456,931   5/1949   Canada.

JOSEPH L. SCHOFER, *Primary Examiner.*

JULIUS GREENWALD, WILLIAM H. SHORT, LEON J. BERCOVITZ, *Examiners.*

J. R. SEILER, M. P. HENDRICKSON,
*Assistant Examiners.*